US010621326B2

(12) United States Patent
Bao et al.

(10) Patent No.: US 10,621,326 B2
(45) Date of Patent: Apr. 14, 2020

(54) IDENTITY AUTHENTICATION METHOD, SERVER, AND STORAGE MEDIUM

(71) Applicant: TENCENT TECHNOLOGY (SHENZHEN) COMPANY LIMITED, Shenzhen (CN)

(72) Inventors: Dongpo Bao, Shenzhen (CN); Huan Jin, Shenzhen (CN); Songjian Wang, Shenzhen (CN); Jianwei Deng, Shenzhen (CN); Yin Li, Shenzhen (CN); Ruizhou Wu, Shenzhen (CN); Cheng Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 230 days.

(21) Appl. No.: 15/675,139

(22) Filed: Aug. 11, 2017

(65) Prior Publication Data
US 2017/0351852 A1    Dec. 7, 2017

Related U.S. Application Data

(63) Continuation of application No. PCT/CN2016/084769, filed on Jun. 3, 2016.

(30) Foreign Application Priority Data

Nov. 24, 2015    (CN) .......................... 2015 1 0828570

(51) Int. Cl.
*G06F 21/24* (2006.01)
*G06F 21/34* (2013.01)
(Continued)

(52) U.S. Cl.
CPC .............. *G06F 21/34* (2013.01); *G06F 21/32* (2013.01); *H04L 12/06* (2013.01); *H04L 29/06* (2013.01);
(Continued)

(58) Field of Classification Search
CPC ...................................................... G06F 21/32
(Continued)

(56) References Cited

U.S. PATENT DOCUMENTS

| 2013/0246199 | A1* | 9/2013 | Carlson | ................. G06Q 20/20 705/16 |
| 2014/0300554 | A1* | 10/2014 | Samuel | ................. G06F 21/32 345/173 |

(Continued)

FOREIGN PATENT DOCUMENTS

| CN | 103020825 A | 4/2013 |
| CN | 104899488 A | 9/2015 |
| CN | 105262779 A | 1/2016 |

OTHER PUBLICATIONS

The World Intellectual Property Organization (WIPO) International Search Report for PCT/CN2016/084769 dated Aug. 23, 2016 pp. 1-5.

*Primary Examiner* — Jacob Lipman
(74) *Attorney, Agent, or Firm* — Anova Law Group, PLLC

(57) ABSTRACT

An identity authentication method is provided, including: obtaining a virtual-resource data processing request sent by a mobile terminal, the virtual-resource data processing request carrying a prestored digital fingerprint, and the digital fingerprint being generated by using device information and user information; performing virtual-resource data processing authentication on the virtual-resource data processing request according to a pre-established user value transfer behavior model; after virtual-resource data processing authentication succeeds, generating a value transfer token according to the digital fingerprint, and returning the value transfer token to the mobile terminal; receiving a value transfer request sent by the mobile terminal, the value transfer request carrying the value transfer token; and check-
(Continued)

ing whether the value transfer token is valid, if the value transfer token is valid, identity authentication succeeding; otherwise, identity authentication failing.

19 Claims, 8 Drawing Sheets

(51) Int. Cl.
| | |
|---|---|
| *H04W 4/029* | (2018.01) |
| *H04L 29/06* | (2006.01) |
| *H04L 12/06* | (2006.01) |
| *H04W 4/02* | (2018.01) |
| *H04W 12/06* | (2009.01) |
| *G06F 21/32* | (2013.01) |
| *G06F 21/62* | (2013.01) |

(52) U.S. Cl.
CPC ........ *H04L 63/083* (2013.01); *H04L 63/0861* (2013.01); *H04W 4/02* (2013.01); *H04W 4/029* (2018.02); *H04W 12/06* (2013.01); *G06F 21/6245* (2013.01)

(58) Field of Classification Search
USPC .......................................................... 726/17
See application file for complete search history.

(56) References Cited

U.S. PATENT DOCUMENTS

| | | |
|---|---|---|
| 2015/0120536 A1 | 4/2015 | Talker |
| 2015/0302404 A1 | 10/2015 | Ruffer |

\* cited by examiner

IDENTITY AUTHENTICATION METHOD, SERVER, AND STORAGE MEDIUM

RELATED APPLICATION

This application is a continuation application of PCT Patent Application No. PCT/CN2016/084769, filed on Jun. 3, 2016, which claims priority to Chinese Patent Application No. 201510828570.4, entitled "IDENTITY AUTHENTICATION METHOD, SERVER, AND SYSTEM" filed with the Chinese Patent Office on Nov. 24, 2015, the entire content of both of which is incorporated herein by reference.

FIELD OF THE TECHNOLOGY

The present disclosure relates to the field of network technologies and, in particular, to an identity authentication method, a server, and a storage medium.

BACKGROUND OF THE DISCLOSURE

As one type of value transfer, mobile payment means performing payment such as purchase of a virtual product or a real product and transfer of cashes and virtual currencies on a mobile device.

In a conventional mobile value transfer process, an identity usually needs to be authenticated. In most value transfer, identity authentication is based on a user password, a user fingerprint, and information about a geographical location at which a user usually performs value transfer. Specifically, in a conventional technical solution, frequently-used geographical location information that corresponds to a user password is obtained by using the password and asking permission from the user; after a corresponding password for value transfer is matched by using the geographical location information, the user is authorized or rejected to perform value transfer, thereby avoiding value transfer at an infrequently-used location and preventing a user account number from being stolen or illegally used by another person.

However, although the above solution resolves problems of value transfer security and remote fraudulent charge for a user to some degree, the user is restricted to performing value transfer only at a known location, and it is not convenient in a use scenario in which there are many locations that the user frequently goes to or in which the location at which the user stays frequently changes (for example, due to a business trip). In addition, after a mobile device or an account number is stolen, value transfer is easily performed by using the account of the user at a location that the user frequently goes to. Consequently, security cannot be ensured.

SUMMARY

This application discloses an identity authentication method, a server, and a storage medium, resolving one or more problems indicated above.

An identity authentication method is provided, including:
obtaining a virtual-resource data processing request sent by a mobile terminal, the virtual-resource data processing request carrying a prestored digital fingerprint, and the digital fingerprint being generated by using device information and user information;
performing virtual-resource data processing authentication on the virtual-resource data processing request according to a pre-established user value transfer behavior model;
after virtual-resource data processing authentication succeeds, generating a value transfer token according to the digital fingerprint, and returning the value transfer token to the mobile terminal;
receiving a value transfer request sent by the mobile terminal, the value transfer request carrying the value transfer token; and
checking whether the value transfer token is valid, if the value transfer token is valid, identity authentication succeeding; otherwise, identity authentication failing.

A server includes a memory and a processor, the memory storing computer instructions and the processor being configured for:
obtaining a virtual-resource data processing request sent by a mobile terminal, the virtual-resource data processing request carrying a prestored digital fingerprint, and the digital fingerprint being generated by using device information and user information;
performing virtual-resource data processing authentication on the virtual-resource data processing request according to a pre-established user value transfer behavior model;
after virtual-resource data processing authentication succeeds, generating a value transfer token according to the digital fingerprint, and returning the value transfer token to the mobile terminal;
checking whether the value transfer token is valid, if the value transfer token is valid, identity authentication succeeding; otherwise, identity authentication failing.

A non-transitory computer-readable storage medium storing computer executable instructions for, when executed by one or more processors, performing an identity authentication method, the method comprising:
obtaining a virtual-resource data processing request sent by a mobile terminal, the virtual-resource data processing request carrying a prestored digital fingerprint, and the digital fingerprint being generated by using device information and user information;
performing virtual-resource data processing authentication on the virtual-resource data processing request according to a pre-established user value transfer behavior model;
after virtual-resource data processing authentication succeeds, generating a value transfer token according to the digital fingerprint, and returning the value transfer token to the mobile terminal;
receiving a value transfer request sent by the mobile terminal, the value transfer request carrying the value transfer token; and
checking whether the value transfer token is valid, if the value transfer token is valid, identity authentication succeeding; otherwise, identity authentication failing.

Details of one or more embodiments of the present invention are provided in the following accompanying drawings and descriptions. Other features, objectives, and advantages of the present disclosure are clear in the specification, accompanying drawings, and claims.

BRIEF DESCRIPTION OF THE DRAWINGS

To describe the technical solutions of the embodiments of the present invention or the existing technology more clearly, the following briefly introduces the accompanying drawings required for describing the embodiments or the existing technology. Apparently, the accompanying drawings in the following description show only some embodiments of the present invention, and a person of ordinary skill in the art may derive other drawings from these accompanying drawings without inventive efforts.

DESCRIPTION OF EMBODIMENTS

To make the objective, technical solutions, and advantages of the present disclosure clearer, the following further describes the present disclosure in detail with reference to the accompanying drawings and embodiments. It should be noted that the specific embodiments described herein are merely intended to explain the present disclosure rather than limit the present disclosure.

Figure 1:
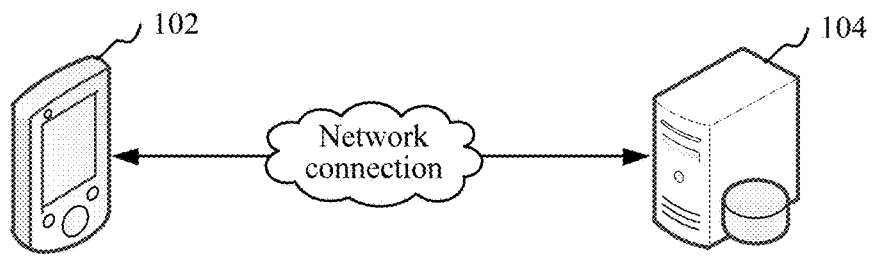
FIG. 1 is a diagram of an application environment of an identity authentication method according to an embodiment.

As shown in FIG. 1, FIG. 1 is a diagram of an application environment of an identity authentication method according to an embodiment. The application environment includes a mobile terminal 102 and a server 104. The mobile terminal 102 may be a smartphone, a notebook computer, a tablet computer, or the like. The mobile terminal 102 communicates with the server 104 by using a network. Various application programs such as various shopping applications and payment applications may run on the mobile terminal 102. There are risks to these network applications when the network applications provide services to users, for example, fraudulent charge by another person. The server 104 provides an identity authentication method, so as to improve value transfer security. There may be one or more servers 104.

Figure 2:
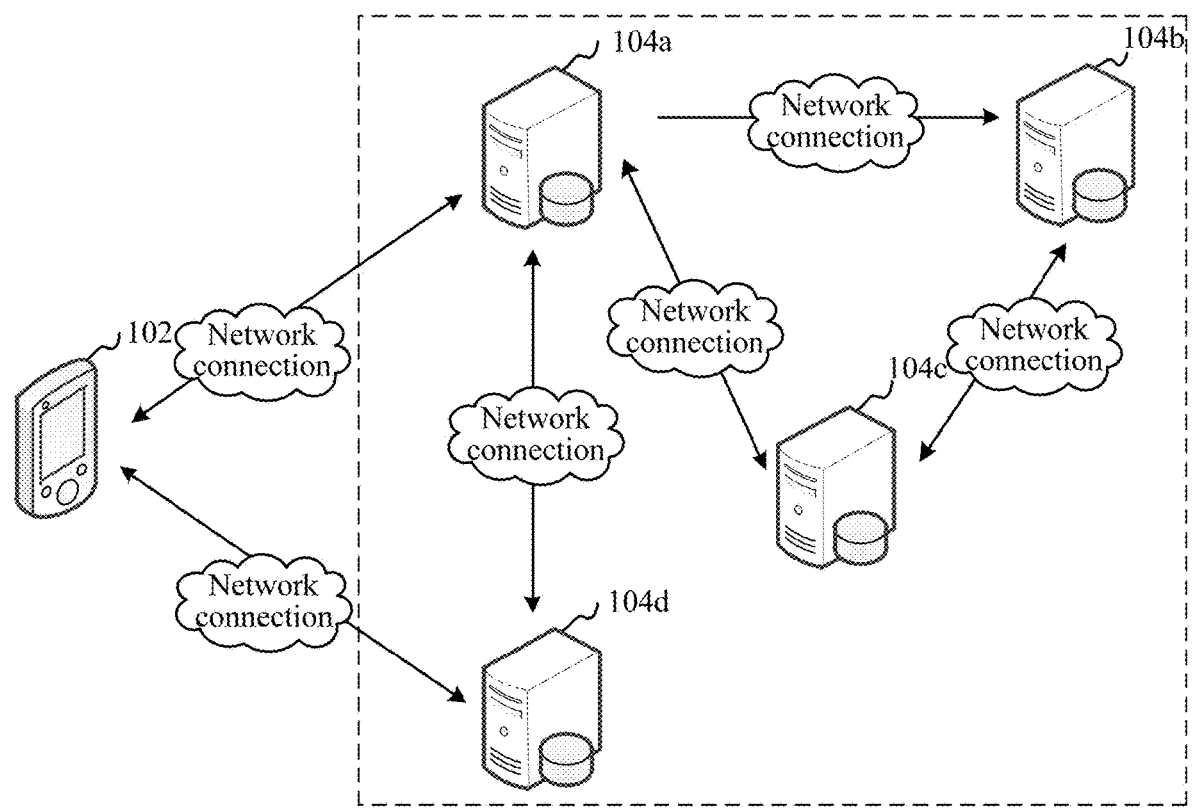
FIG. 2 is a diagram of an application environment of an identity authentication method according to another embodiment.

As shown in FIG. 2, FIG. 2 is a diagram of an application environment of an identity authentication method according to another embodiment. The application environment includes a mobile terminal 102, an order server 104a, a behavior analysis server 104b, a risk control server 104c, and a payment server 104d. A payment application program runs on the mobile terminal 102, and the mobile terminal 102 sends at least a virtual-resource data processing request and a value transfer request. The order server 104a is configured to receive the virtual-resource data processing request sent by the mobile terminal 102. The behavior analysis server 104b is configured to collect and analyze information included in a login request sent by the mobile terminal 102 and information included in the virtual-resource data processing request fed back by the order server 104a. The risk control server 104c is configured to provide a service of virtual-resource data processing authentication to the order server 104a according to an analysis result provided by the behavior analysis server 104b. After virtual-resource data processing authentication succeeds, the order server 104a generates a value transfer token according to a prestored digital fingerprint, and returns the value transfer token to the mobile terminal 102. The payment server 104d is configured to: receive the value transfer request that carries the value transfer token and that is sent by the mobile terminal 102, and check, by using the order server 104a, whether the value transfer token is valid. If the value transfer token is valid, the payment server 104d starts value transfer, that is, payment processing.

Figure 3:
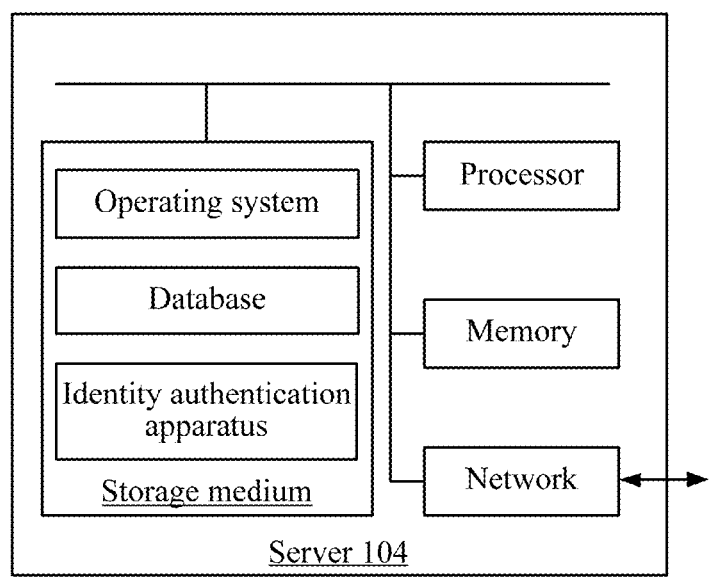
FIG. 3 is a schematic diagram of an internal structure of a server according to an embodiment.

In an embodiment, a schematic diagram of an internal structure of the server 104 in FIG. 1 is shown in FIG. 3. The server 104 includes a processor, a memory, a non-volatile storage medium, and a network interface that are connected by using a system bus. The storage medium of the server stores an operating system and an identity authentication apparatus. The identity authentication apparatus is configured to execute an identity authentication method. The processor of the server 104 is configured to execute an identity authentication method, and is configured to provide computing and control capabilities, to support operating of the entire server 104. The memory of the server 104 provides an environment for operating of the identity authentication apparatus in the storage medium. The network interface of the server 104 is configured to perform network communication with mobile terminal 102, for example, receive the login request, the virtual-resource data processing request, the value transfer request, and the like that are sent by the mobile terminal 102, and return the value transfer token to the mobile terminal 102.

Figure 4:
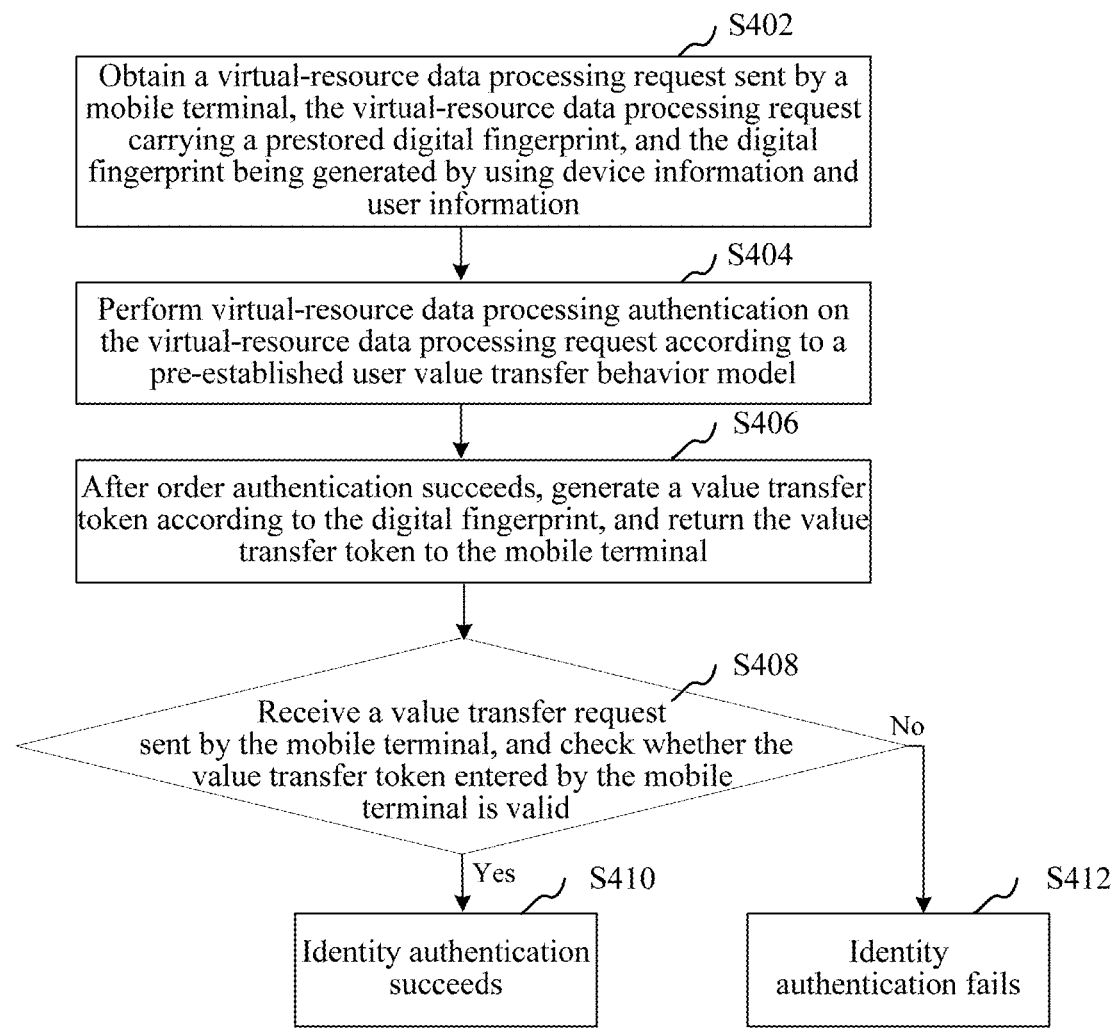
FIG. 4 is a schematic flowchart of an identity authentication method according to an embodiment.

As shown in FIG. 4, in an embodiment, an identity authentication method is provided. This embodiment is described by using an example in which the method is applied to the server in FIG. 1. In this embodiment, payment is used as an example of value transfer. A virtual-resource data processing request is an order request, a value transfer behavior model is payment behavior model, virtual-resource data processing authentication is order authentication, a value transfer token is a payment token, and a value transfer request is a payment request. The identity authentication method specifically includes the following steps:

Step S402: Obtain a virtual-resource data processing request sent by a mobile terminal, the virtual-resource data processing request carrying a prestored digital fingerprint, and the digital fingerprint being generated by using device information and user information.

Specifically, when a user places an order on the mobile terminal, the mobile terminal sends an order request to the server. The order request carries a prestored digital fingerprint, and the digital fingerprint is generated by the mobile terminal by using device information and user information. Generation and use of the digital fingerprint include, but are not limited to, a mobile phone number, a SIM (subscriber identity module) card number, an IMEI (international mobile equipment identity) number, an IMSI (international mobile subscriber identity) number, and another piece of information that can be used to identify a user and user equipment.

Step S404: Perform virtual-resource data processing authentication on the virtual-resource data processing request according to a pre-established user value transfer behavior model. If the virtual-resource data processing authentication succeeds, step S406 is performed; if the virtual-resource data processing authentication fails, value transfer ends, so as to avoid a unnecessary loss caused to a user by a value transfer behavior that is not performed by the user.

In an embodiment, step S404 is specifically: performing information matching on the virtual-resource data processing request and the pre-established user value transfer behavior model, if a matching degree is not less than a matching threshold, the virtual-resource data processing authentication succeeds; otherwise, the virtual-resource data processing authentication fails.

Specifically, after obtaining the order request, the server performs order authentication. Order authentication includes: determining validity of a product according to product information, and performing information matching on the order request and a pre-established user payment behavior model after the validity of the product is determined. First, statistics about the product information (for example, an ID, a price, and a discount of the product that the user needs to pay for), frequently-used geographical location information of the user, a frequently-used network IP, a frequently-used mobile terminal (digital fingerprint information), payment frequency, a payment limit, a payment currency, a consumption habit, and the like are collected according to historical order requests. Then, the user payment behavior model is established by using the collected information. Finally, the order request is analyzed according to the user payment behavior model.

Specifically, the user payment behavior model is closely associated with a payment habit, history, place, activity time, and the like of the user. Validity of user payment may be determined according to the formed user payment behavior model after sample collection, learning, and training for a period of time. All of a user payment amount, a merchant to which and a product category for which the user frequently pays, a time period of relatively active payment of the user, geographical location information, a network type, a WiFi network SSID (Service Set Identifier, service set identifier), and the like may be used as dimensions to recognize a user, to establish an original user payment behavior model.

From the perspective of the user, based on a conventional password authentication manner, in the identity authentication method, the user's reliance on a password is reduced as far as possible, and a user payment behavior model is established. If the model is determined to be secure, password-free payment may be performed. Otherwise, password authentication or other basic authentication may be performed. This effectively avoids loss caused after a password is stolen.

From the perspective of the merchant, for example, low spikes and coupons are usually used in current e-commerce promotion. However, in the promotion, network hackers usually grab these spikes or coupons in an automatic manner by registering with a large quantity of new user names by using code, and sell for a gain. Benefits in the marketing policies of the merchant are obtained by a small quantity of people, bringing the merchant a large loss. Therefore, from the perspective of the merchant, in the identity authentication method, a common user and a fake user or a stolen account number may be recognized, thereby preventing the merchant from suffering a loss.

Every time a user places an order, information and data related to the order are stored in the server. The server collects statistics about all historical order requests and trains the statistics information, to establish a user payment behavior model. The user payment behavior model records a user identifier, a geographical location of a mobile terminal, a network IP, a digital fingerprint uniquely corresponding to the mobile terminal, a normal consumption habit of the user, and the like. For example, after a payment request and information in the user payment behavior model are matched, it is found that the user usually spends money in Beijing but a current order request is from Shanghai, or that the user generally consumes a small amount of money but a current order request shows a high consumption amount. In this way, analysis is performed according to a weight of each piece of information, to calculate a matching degree between an order request and the user payment behavior model. If the matching degree is not less than the matching threshold; order authentication succeeds; otherwise, order authentication fails. If order authentication fails, confirmation on a related payment behavior is performed with the user by means of confirmation.

Step S406: Generate a value transfer token according to the digital fingerprint, and return the value transfer token to the mobile terminal.

Specifically, after order authentication succeeds, the server generates a payment token by using the digital fingerprint and a specific algorithm, and returns the payment token to the mobile terminal.

Step S408: Receive a value transfer request sent by the mobile terminal, and check whether the value transfer token sent by the mobile terminal is valid. If the value transfer token is valid, step S410 is performed; if the value transfer token is invalid, step S412 is performed. The value transfer request carries the value transfer token.

Specifically, after receiving the payment token, the mobile terminal encrypts the payment token by using the digital fingerprint, and sends the encrypted payment token and the payment request together to the server. The server decrypts the payment token by using the prestored digital fingerprint. If decryption succeeds, it indicates that the payment token is valid; otherwise, it indicates that the payment token is invalid.

Step S410: Identity authentication succeeds.

If order authentication succeeds and the payment token sent by the mobile terminal is valid, it indicates that the user sends the payment request by using the mobile terminal. In this case, identity authentication succeeds, and payment is allowed.

In an embodiment, the user may use multiple payment manners such as in-application payment and band card payment.

Step S412: Identity authentication fails.

If the payment token is invalid, the payment token may have been stolen by a third-party terminal, or the payment token is not a payment token generated by the server before. In this case, identity authentication fails, and payment is rejected to control risks.

According to the identity authentication method, in a process of sending a virtual-resource data processing request by a mobile terminal, a prestored digital fingerprint is carried. The digital fingerprint is generated by using device information and user information. After the virtual-resource data processing request of the mobile terminal is obtained, virtual-resource data processing authentication is performed on the virtual-resource data processing request according to a pre-established user value transfer behavior model, and after virtual-resource data processing authentication succeeds, a value transfer token is generated according to the digital fingerprint and is returned to the mobile terminal. Finally, a value transfer request that carries the value transfer token and that is sent by the mobile terminal is obtained, and whether the value transfer token is valid is checked. If the value transfer token is valid, identity authentication succeeds; otherwise, identity authentication fails. After two-step authentication of virtual-resource data processing authentication and value transfer token checking, after the mobile terminal or an account number is stolen, illegal value transfer using an account of a user is well avoid, thereby effectively improving data transfer security. In addition, the value transfer token returned to the mobile terminal is generated according to the digital fingerprint. In this way, the user is not restricted to perform value transfer only at a known location, facilitating convenience in data transfer.

In addition, in an embodiment, before step S402, a step of obtaining a login request sent by the mobile terminal is further included.

Specifically, an application used for implementing mobile payment runs on the mobile terminal. A user identifier input box and a login request trigger control (for example, a button or a hyperlink) are provided in an application screen. A user enters a user identifier and a login request trigger instruction by using an input device such as a touch screen, a key, or a trackball of the mobile terminal, so that the mobile terminal sends a login request to the server. The login request includes the user identifier, a geographical location of the mobile terminal, a network IP, and a digital fingerprint uniquely corresponding to the mobile terminal. The digital fingerprint is generated by the mobile terminal by using device information and user information, and does not depend on user privacy information (for example, the geographical location of the mobile terminal). Herein, the user information is information that cannot be used for tracking an identity of a specific user but can be used for recognizing a determined user at the other end of a network. Even though the user information is obtained by another person, a target user cannot be directly positioned and marked. For example, the user information is the user identifier. The user privacy information refers to a mobile phone number, an identity card number, a gender, an age, a specific residential address, a working unit, and the like of a user, and can be used for easily and successfully finding the user if obtained by another person.

The user identifier is a unique identifier, for example, an account, of a user that needs to send a login request. The user identifier may be a character string including at least one type of numbers, letters, or punctuations. The geographical location of the mobile terminal is obtained by a navigation positioning application of the mobile terminal. In addition, a network IP is allocated to the mobile terminal when a network is available. The mobile terminal calculates, samples, and encrypts the device information and the user information on the mobile terminal, and calculates, by using a specific conversion algorithm, a digital fingerprint that is unrelated to the user privacy information (for example, a geographical location) and that cannot be reversed, to mark the unique mobile terminal. The digital fingerprint is stored locally on the mobile terminal in a encryption manner, and is uploaded to the server for subsequent analysis.

Specifically, in the conversion algorithm, normalization first needs to be performed on collected user information in a background system (for example, matching is performed on coordinates of a geographical location and a marked point of a geographical location in the background; after normalization, information about a geographical location within a range is mapped to a marked point of a location in the background; however, this point cannot be mapped to specific coordinates of a geographical location). The normalized user information is then combined and sorted according to a specific policy, to obtain data (that is, the digital fingerprint) for storage. The same conversion algorithm is performed on data information reported by the user every time before payment, to obtain a digital fingerprint. Statistical checking (for example, variance calculation) is performed on the digital fingerprint and the stored digital fingerprint. The digital fingerprint is considered to be secure if a result is within a specific threshold. In addition, after each payment, the stored digital fingerprint may be modify and updated by using a new digital fingerprint (for example, the first stored digital fingerprint is replaced with the new digital fingerprint), so as to gradually improve an accuracy rate and provide specific fault tolerance. In a special case, a digital fingerprint may be modified in a manner of manually screening samples.

In an embodiment, before step S404, a step of updating the user payment behavior model according to the last order request is further included. A virtual-resource data processing behavior model of the user is continuously updated to improve an accuracy rate of virtual-resource data processing authentication.

In an embodiment, after the step of obtaining a value transfer request of the mobile terminal and check whether the value transfer token entered by the mobile terminal is valid, the following steps are further included: performing payment in a deduction manner, and generating a payment bill; determining validity of the payment bill; and notifying the mobile terminal of a success in value transfer.

Figure 5:
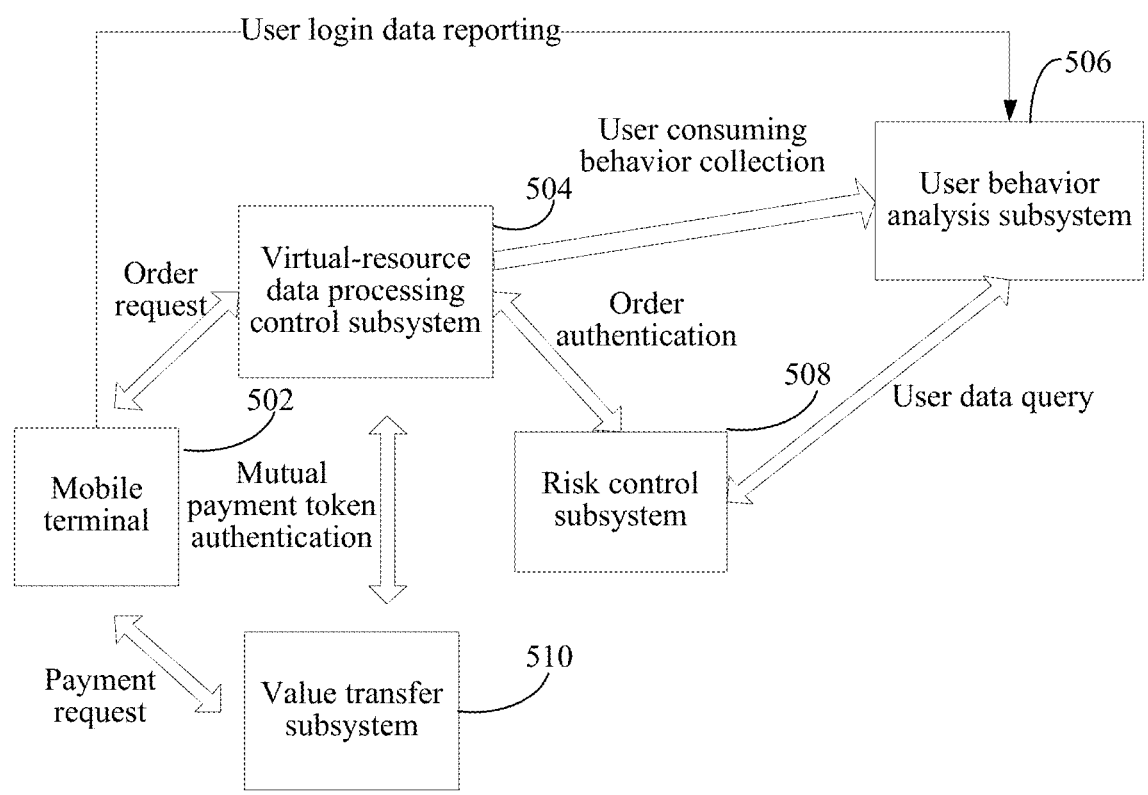
FIG. 5 is a schematic architecture diagram of an identity authentication system according to an embodiment.

As shown in FIG. 5, in an embodiment, an identity authentication system is further provided. The system includes a mobile terminal 502, a virtual-resource data processing control subsystem 504, a user behavior analysis subsystem 506, a risk control subsystem 508, and a value transfer subsystem 510.

The virtual-resource data processing control subsystem 504 is configured to: obtain a virtual-resource data processing request sent by a mobile terminal, the virtual-resource data processing request carrying a prestored digital fingerprint, and the digital fingerprint being generated by using device information and user information.

The user behavior analysis subsystem 506 is configured to collect a historical virtual-resource data processing request and a historical login request of a user, to establish a user value transfer behavior model.

The risk control subsystem 508 is configured to perform virtual-resource data processing authentication on the virtual-resource data processing request according to the user value transfer behavior model.

The virtual-resource data processing control subsystem 504 is configured to: after virtual-resource data processing authentication succeeds, generate a value transfer token according to the digital fingerprint, and return the value transfer token to the mobile terminal.

The value transfer subsystem 510 is configured to receive a value transfer request sent by the mobile terminal, the value transfer request carrying the value transfer token. The value transfer subsystem 510 is further configured to check whether the value transfer token is valid. If the value transfer token is valid, identity authentication succeeds; otherwise, identity authentication fails.

In an embodiment, the user behavior analysis subsystem 506 is further configured to collect a historical login request of the user and update the user value transfer behavior model according to the last virtual-resource data processing request.

Figure 6:
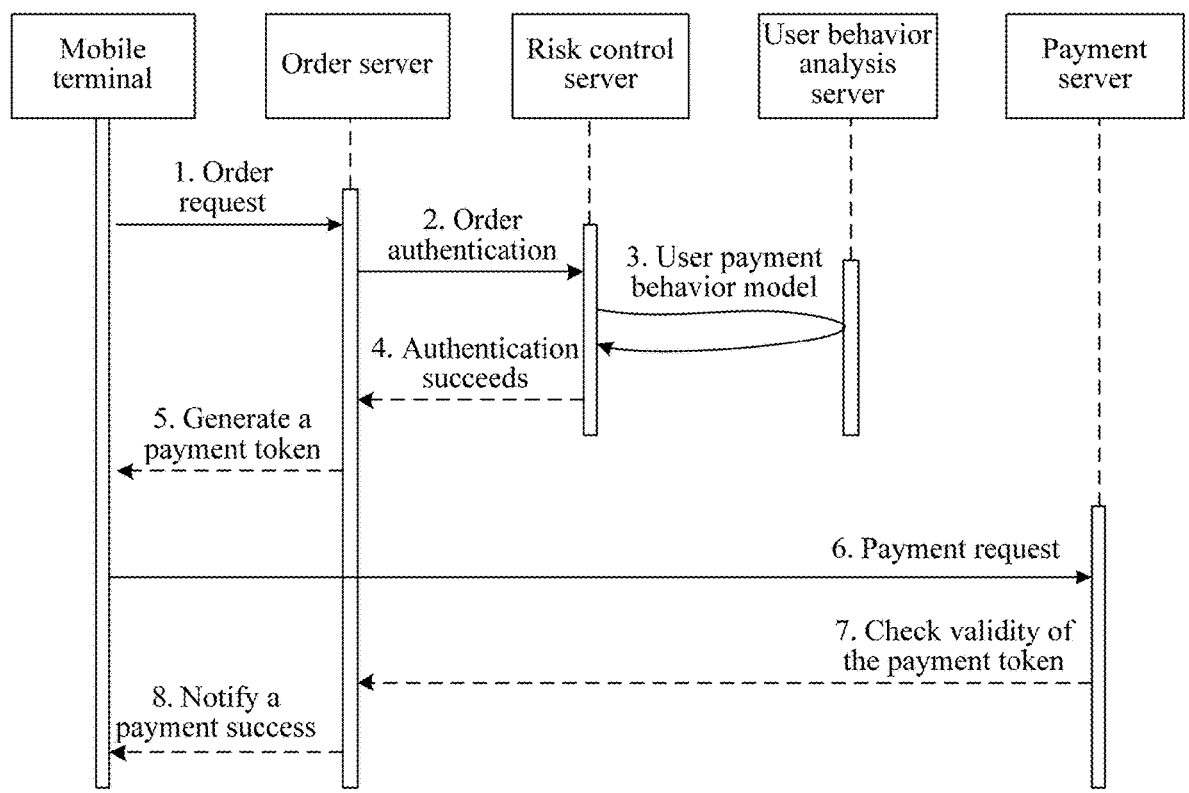
FIG. 6 is a time sequence diagram of an identity authentication process according to an embodiment.

The principle of the identity authentication method is described below in a specific application scenario. The application scenario is described by using an example in which a mobile phone is used as the mobile terminal. For a sequence diagram of an identity authentication process, refer to FIG. 6.

Figure 7:
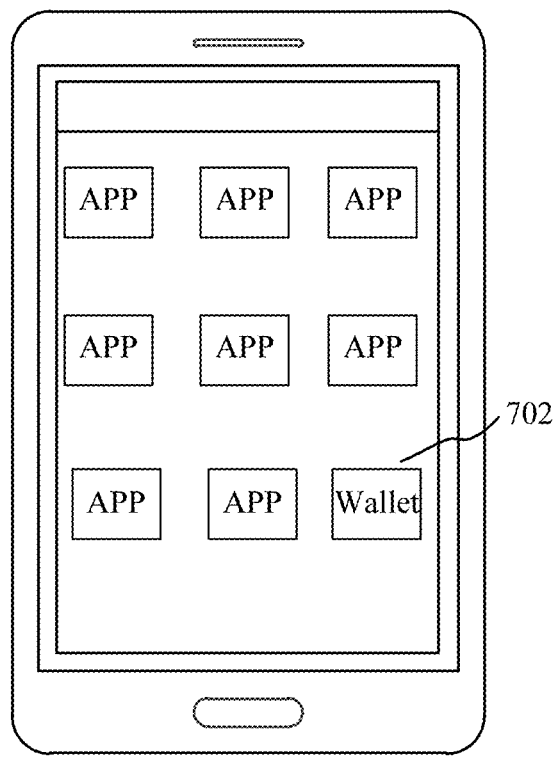
FIG. 7 is a first diagram of a terminal screen in an identity authentication process in a specific application scenario.

As shown in FIG. 7, a user installs payment software on a mobile phone, accesses a login screen by tapping an icon 702 of the payment software, and sends a login request in the login screen for logging in.

Figure 8:
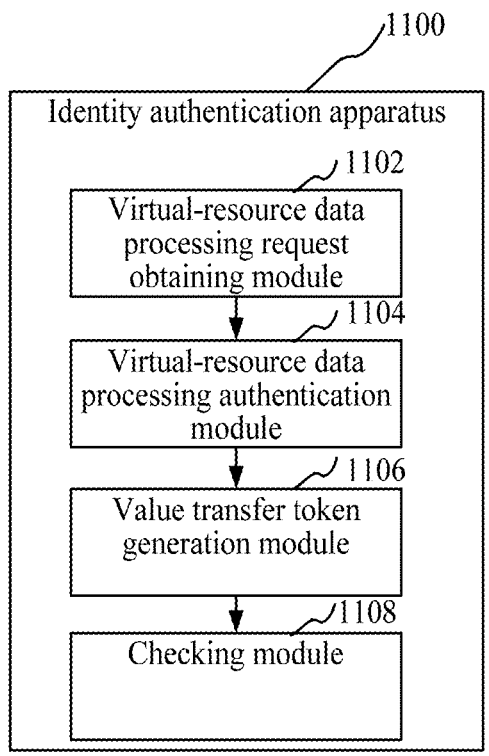
FIG. 8 is a second diagram of a terminal screen in an identity authentication process in a specific application scenario.
Figure 9:
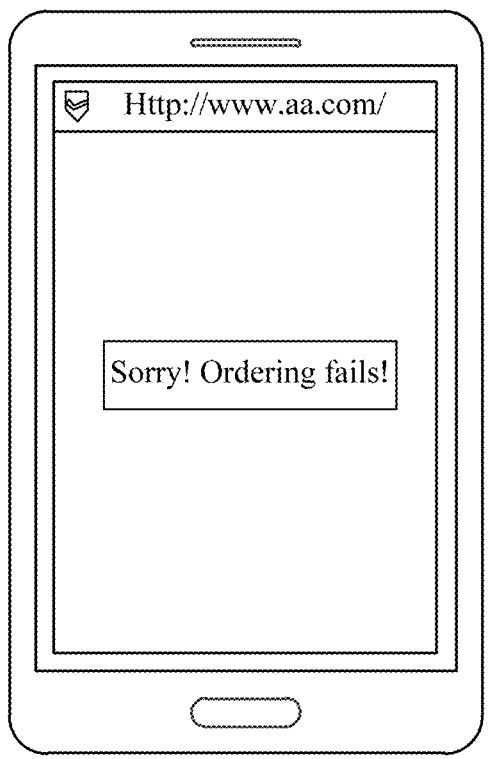
FIG. 9 is a third diagram of a terminal screen in an identity authentication process in a specific application scenario.
Figure 10:
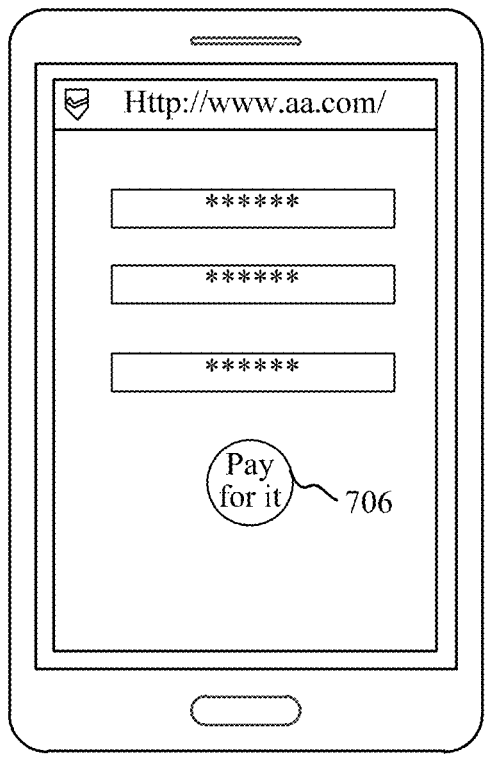
FIG. 10 is a fourth diagram of a terminal screen in an identity authentication process in a specific application scenario.

As shown in FIG. 8, after selecting a corresponding product, the user may tap an ordering button 704 to send an order request. The order request carries a prestored digital fingerprint. The digital fingerprint is generated by using device information and user information. After receiving an order request, an order server saves information included in the order request. Further, the order server initiates order confirmation to a risk control server. During an order confirmation process, the order server needs to query related data in a user behavior analysis subsystem. Every time the user places an order, information and data related to the order are stored in the user behavior analysis server. The user behavior analysis server collects statistics about all historical order requests and trains the statistics information, to establish a user payment behavior model. Order authentication is performed on the order request according to the user payment behavior model pre-established by the user behavior analysis server. The user payment behavior model records frequently-used geographical location information of the user, a frequently-used network IP, a frequently-used mobile terminal (according to digital fingerprint information), payment frequency, a payment limit, a payment currency, a consumption habit, and the like. Matching is performed on a payment request and information in the user payment behavior model separately, to determine whether order authentication succeeds. If order authentication fails, a subsequent payment process is not performed. For a specific screen, refer to FIG. 9. If order authentication succeeds, the order server generates a payment token and returns the payment token to the mobile terminal. Then the user may access a payment screen, as shown in FIG. 10.

After receiving the payment token sent by the order server, a mobile terminal encrypts the payment token by using a prestored digital fingerprint. The user taps a payment button 706, and the mobile terminal sends the encrypted payment token and the payment request together to a payment server. After receiving the payment token, the payment server checks validity of the payment token. If the payment token is valid, payment is allowed, and a payment success message is sent to the mobile terminal. Otherwise, payment is rejected.

An embodiment of the present invention further provides a server. An internal structural of the server may correspond to the structure shown in FIG. 3. All or some of the following modules may be implemented by using software, hardware, or a combination thereof.

Figure 11:
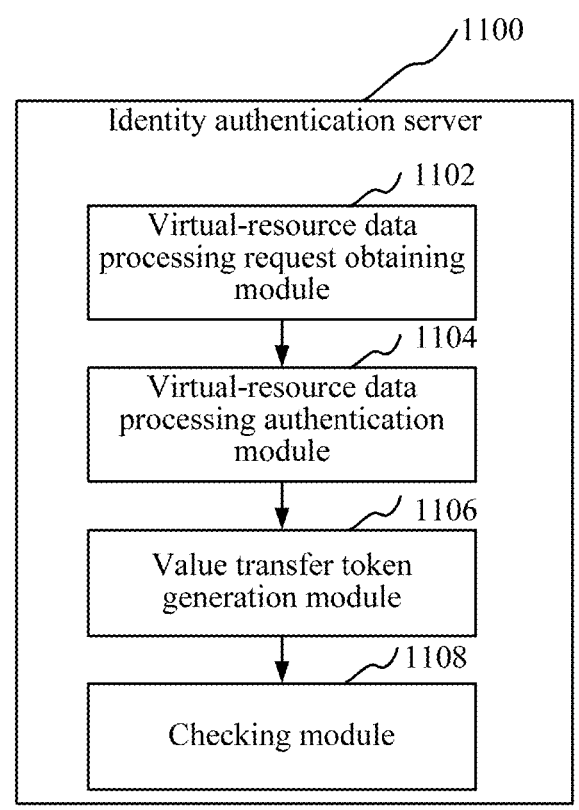
FIG. 11 is a block diagram of a server according to an embodiment.

In an embodiment, as shown in FIG. 11, the server 1100 in this embodiment includes a virtual-resource data processing request obtaining module 1102, a virtual-resource data processing authentication module 1104, a value transfer token generation module 1106, and a checking module 1108.

Specifically, the virtual-resource data processing request obtaining module 1102 is configured to: obtain a virtual-resource data processing request sent by a mobile terminal, the virtual-resource data processing request carrying a prestored digital fingerprint, and the digital fingerprint being generated by using device information and user information.

The virtual-resource data processing authentication module 1104 is configured to perform virtual-resource data processing authentication on the virtual-resource data processing request according to a pre-established user value transfer behavior model.

In an embodiment, the virtual-resource data processing authentication module 1104 includes an information matching unit, configured to perform information matching on an order request and the pre-established user value transfer behavior model. If a matching degree is not less than a matching threshold, the virtual-resource data processing authentication succeeds; otherwise, the virtual-resource data processing authentication fails.

The value transfer token generation module 1106 is configured to: after virtual-resource data processing authentication succeeds, generate a value transfer token according to the digital fingerprint, and return the value transfer token to the mobile terminal.

The checking module 1108 is configured to check whether the value transfer token is valid. If the value transfer token is valid, the identity authentication succeeds; otherwise, the identity authentication fails.

In an embodiment, the checking module 1108 receives a value transfer request sent by the mobile terminal, the value transfer request carrying the value transfer token, and the value transfer token carried in the value transfer request is a value transfer token obtained after the value transfer token is encrypted by the mobile terminal using the digital fingerprint. The checking module 1108 includes a decryption unit, configured to decrypt the encrypted value transfer token by invoking the digital fingerprint, if decryption succeeds, the value transfer token being valid; if decryption fails, the value transfer token being invalid.

Further, in an embodiment, the identity authentication server further includes a login request obtaining module. The login request obtaining module is configured to obtain a login request sent by the mobile terminal.

The identity authentication server further includes a model update module. The model update module is configured to update the user value transfer behavior model according to the last virtual-resource data processing request.

A person of ordinary skill in the art may understand that all or some of the processes of the method in the foregoing embodiments may be implemented by a computer program instructing relevant hardware. The program may be stored in a computer readable storage medium. During execution, the program may include the processes in the foregoing method embodiment. The storage medium may be non-volatile storage medium such as a disk, an optical disc, or a read-only memory (Read-Only Memory, ROM), a random access memory (Random Access Memory, RAM), or the like.

Various technical features of the embodiments may be randomly combined. For brevity, not all possible combinations of the technical features of the embodiments are described. However, the technical features shall be construed as falling within the scope of this specification provided that no conflict exists in the combinations of the technical features.

The foregoing embodiments only describe several implementations of the present disclosure, and their description is specific and detailed, but cannot therefore be understood as a limit to the patent scope of the present disclosure. It should be noted that a person of ordinary skill in the art may further make variations and improvements without departing from the conception of the present disclosure, and these all fall within the protection scope of the present disclosure. Therefore, the patent protection scope of the present disclosure should be subject to the appended claims.

What is claimed is:

1. An identity authentication method, comprising:
   obtaining a virtual-resource data processing request sent by a mobile terminal, the virtual-resource data processing request carrying a prestored digital fingerprint, and the digital fingerprint being generated by using device information and user information;
   performing virtual-resource data processing authentication on the virtual-resource data processing request according to a pre-established user value transfer behavior model, wherein the user value transfer behavior model corresponding to a user associated with the digital fingerprint is trained using collection of historical activities of the user, the historical activities including at least one of payment history, payment place, and activity time; and wherein the user value transfer behavior model is used to compare with information related to the virtual-resource data processing request to authenticate whether the virtual-resource data processing request is made by the user;
   if the virtual-resource data processing authentication fails, denying a value transfer associated with the virtual-resource data processing request;
   if the virtual-resource data processing authentication succeeds, generating a value transfer token according to the digital fingerprint, and returning the value transfer token to the mobile terminal;
   after the value transfer token is returned to the mobile terminal based on the virtual-resource data processing authentication, receiving a value transfer request sent by the mobile terminal, the value transfer request carrying the value transfer token; and
   checking whether the value transfer token is valid, wherein, if the value transfer token is valid, identity authentication succeeds; otherwise, the identity authentication fails,
   wherein the virtual-resource data request is an order request for a product from a merchant, and performing the virtual-resource data processing authentication on the virtual-resource data processing request further comprises:
      determining validity of the product according to order requests from a plurality of users directed to the same merchant; and
      after the validity of the product is determined, performing information matching on the order request and the user value transfer behavior model of the user.

2. The method according to claim 1, the performing virtual-resource data processing authentication on the virtual-resource data processing request according to a pre-established user value transfer behavior model comprising:
   performing information matching on the virtual-resource data processing request and the pre-established user value transfer behavior model, if a matching degree is not less than a matching threshold, virtual-resource data processing authentication succeeding; otherwise, virtual-resource data processing authentication failing.

3. The method according to claim 1, the value transfer token carried in the value transfer request being a value transfer token obtained after the value transfer token is encrypted by using the digital fingerprint; and
   the checking whether the value transfer token is valid comprising:
      decrypting the encrypted value transfer token by invoking the digital fingerprint, wherein, if the decryption succeeds, the value transfer token is valid; if the decryption fails, the value transfer token is invalid.

4. The method according to claim 1, before the step of obtaining a virtual-resource data processing request sent by a mobile terminal, the method further comprising:
   updating the user value transfer behavior model according to the last virtual-resource data processing request.

5. The method according to claim 1, wherein determining the validity of the product according to the order requests from the plurality of users directed to the same merchant further comprises:
   determining the validity of the product based on a discount of the product and user registration time of the plurality of users.

6. The method according to claim 1, wherein:
   the user value transfer behavior model is established and maintained by the a user behavior analysis server;
   the virtual-resource data processing authentication is requested by an order server and performed by a risk control server, the risk control server being in communication with the user behavior analysis server to access the user value transfer behavior model;
   when the risk control server determines that virtual-resource data processing authentication succeeds and informs the order server, the value transfer token is generated by the order server and returned by the order server to the mobile terminal; and
   the value transfer request is sent by the mobile terminal to a payment server.

7. The method according to claim 1, before the step of obtaining a virtual-resource data processing request sent by a mobile terminal, the method further comprising:
   obtaining a login request sent by the mobile terminal.

8. The method according to claim 7, wherein:
   the digital fingerprint uniquely identifies the mobile terminal and uniquely identifies a user logged in with the user terminal.

9. The method according to claim 8, further comprising:
   replacing the digital fingerprint with an updated digital fingerprint after the identity authentication succeeds and the value transfer request is processed.

10. A server, comprising a memory and a processor, the memory storing computer instructions and the processor being configured for:
    obtaining a virtual-resource data processing request sent by a mobile terminal, the virtual-resource data processing request carrying a prestored digital fingerprint, and the digital fingerprint being generated by using device information and user information;
    performing virtual-resource data processing authentication on the virtual-resource data processing request according to a pre-established user value transfer behavior model, wherein the user value transfer behavior model corresponding to a user associated with the digital fingerprint is trained using collection of historical activities of the user, the historical activities including at least one of payment habit, payment history, payment place, and activity time; and wherein the user value transfer behavior model is used to compare with information related to the virtual-resource data processing request to authenticate whether the virtual-resource data processing request is made by the user;
    if the virtual-resource data processing authentication fails, denying a value transfer associated with the virtual-resource data processing request;
    if the virtual-resource data processing authentication succeeds, generating a value transfer token according to the digital fingerprint, and returning the value transfer token to the mobile terminal;

after the value transfer token is returned to the mobile terminal based on the virtual-resource data processing authentication, receiving a value transfer request sent by the mobile terminal, the value transfer request carrying the value transfer token; and checking whether the value transfer token is valid, if the value transfer token is valid, identity authentication succeeding; otherwise, identity authentication failing, wherein the virtual-resource data request is an order request for a product from a merchant, and performing the virtual-resource data processing authentication on the virtual-resource data processing request further comprises:

determining validity of the product according to order requests from a plurality of users directed to the same merchant; and after the validity of the product is determined, performing information matching on the order request and the user value transfer behavior model of the user.

11. The server according to claim 10, the instruction, the processor being further configured for:

obtaining a login request sent by the mobile terminal.

12. The server according to claim 10, the processor being further configured for:

performing information matching on the virtual-resource data processing request and the pre-established user value transfer behavior model, if a matching degree is not less than a matching threshold, virtual-resource data processing authentication succeeding; otherwise, virtual-resource data processing authentication failing.

13. The server according to claim 10, the value transfer token carried in the value transfer request being a value transfer token obtained after the value transfer token is encrypted by using the digital fingerprint; and the processor being further configured for:

decrypting the encrypted value transfer token by invoking the digital fingerprint, if decryption succeeds, the value transfer token being valid; if decryption fails, the value transfer token being invalid.

14. The server according to claim 10, the processor being further configured for:

updating the user value transfer behavior model according to the last virtual-resource data processing request.

15. A non-transitory computer-readable storage medium storing computer executable instructions for, when executed by one or more processors, performing an identity authentication method, the method comprising:

obtaining a virtual-resource data processing request sent by a mobile terminal, the virtual-resource data processing request carrying a prestored digital fingerprint, and the digital fingerprint being generated by using device information and user information;

performing virtual-resource data processing authentication on the virtual-resource data processing request according to a pre-established user value transfer behavior model, wherein the user value transfer behavior model corresponding to a user associated with the digital fingerprint is trained using collection of historical activities of the user, the historical activities including at least one of payment habit, payment history, payment place, and activity time; and wherein the user value transfer behavior model is used to compare with information related to the virtual-resource data processing request to authenticate whether the virtual-resource data processing request is made by the user;

if the virtual-resource data processing authentication fails, denying a value transfer associated with the virtual-resource data processing request;

if the virtual-resource data processing authentication succeeds, generating a value transfer token according to the digital fingerprint, and returning the value transfer token to the mobile terminal;

after the value transfer token is returned to the mobile terminal based on the virtual-resource data processing authentication, receiving a value transfer request sent by the mobile terminal, the value transfer request carrying the value transfer token; and checking whether the value transfer token is valid, if the value transfer token is valid, identity authentication succeeding; otherwise, identity authentication failing, wherein the virtual-resource data request is an order request for a product from a merchant, and performing the virtual-resource data processing authentication on the virtual-resource data processing request further comprises:

determining validity of the product according to order requests from a plurality of users directed to the same merchant; and after the validity of the product is determined, performing information matching on the order request and the user value transfer behavior model of the user.

16. The non-transitory computer-readable storage medium according to claim 15, before the step of obtaining a virtual-resource data processing request sent by a mobile terminal, the method further comprising:

obtaining a login request sent by the mobile terminal.

17. The non-transitory computer-readable storage medium according to claim 15, the performing virtual-resource data processing authentication on the virtual-resource data processing request according to a pre-established user value transfer behavior model comprising:

performing information matching on the virtual-resource data processing request and the pre-established user value transfer behavior model, if a matching degree is not less than a matching threshold, virtual-resource data processing authentication succeeding; otherwise, virtual-resource data processing authentication failing.

18. The non-transitory computer-readable storage medium according to claim 15, the value transfer token carried in the value transfer request being a value transfer token obtained after the value transfer token is encrypted by using the digital fingerprint; and the checking whether the value transfer token is valid comprising:

decrypting the encrypted value transfer token by invoking the digital fingerprint, wherein, if the decryption succeeds, the value transfer token is valid; if the decryption fails, the value transfer token is invalid.

19. The non-transitory computer-readable storage medium according to claim 15, before the step of obtaining a virtual-resource data processing request sent by a mobile terminal, the method further comprising:

updating the user value transfer behavior model according to the last virtual-resource data processing request.

* * * * *